(12) United States Patent
Hager et al.

(10) Patent No.: US 7,185,538 B2
(45) Date of Patent: Mar. 6, 2007

(54) METHODS AND SYSTEMS FOR SENSING AIR VEHICLE AIRSPEED

(75) Inventors: James R. Hager, Golden Valley, MN (US); Steven H. Thomas, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 66 days.

(21) Appl. No.: 10/987,811

(22) Filed: Nov. 12, 2004

(65) Prior Publication Data

US 2006/0101923 A1    May 18, 2006

(51) Int. Cl.
*G01F 15/08* (2006.01)

(52) U.S. Cl. .......................................... 73/200

(58) Field of Classification Search ............... 73/178, 73/118.2, 180, 200, 178 R; 340/963; 244/48; 60/777
See application file for complete search history.

(56) References Cited

U.S. PATENT DOCUMENTS

| | | | |
|---|---|---|---|
| 4,437,343 A | 3/1984 | Dixon et al. | |
| 4,485,671 A | 12/1984 | Kershner | |
| 4,836,019 A * | 6/1989 | Hagen et al. | 73/180 |
| 4,981,035 A * | 1/1991 | Hall | 73/118.2 |
| 5,103,629 A * | 4/1992 | Mumford et al. | 60/778 |
| 5,134,394 A | 7/1992 | Beadle | |
| 5,299,455 A | 4/1994 | Mangalam | |
| 5,438,880 A | 8/1995 | Washburn | |
| 5,639,964 A | 6/1997 | Djorup | |
| 5,797,105 A | 8/1998 | Nakaya et al. | |
| 5,912,627 A | 6/1999 | Alexander | |
| 6,101,429 A | 8/2000 | Sarma et al. | |
| 6,134,959 A | 10/2000 | Mangalam et al. | |
| 6,230,570 B1 | 5/2001 | Clark et al. | |
| 6,250,149 B1 * | 6/2001 | Black | 73/178 R |
| 6,271,769 B1 * | 8/2001 | Frantz | 340/963 |
| 6,531,967 B2 | 3/2003 | Djorup | |
| 6,532,434 B1 | 3/2003 | West | |
| 6,641,084 B1 * | 11/2003 | Huber et al. | 244/48 |
| 6,772,976 B1 | 8/2004 | Rouse et al. | |

* cited by examiner

*Primary Examiner*—Jewel Thompson
(74) *Attorney, Agent, or Firm*—Andrew Abeyta, Esq.; Armstrong Teasdale LLP

(57) ABSTRACT

A system for determining airspeed of an air vehicle is described which includes and airflow sensor and a processor. The airflow sensor is located within an airflow path extending substantially through the air vehicle, and the processor is configured to receive a signal relating to an airflow rate from the airflow sensor and output an airspeed based on the received signal.

23 Claims, 4 Drawing Sheets

METHODS AND SYSTEMS FOR SENSING AIR VEHICLE AIRSPEED

BACKGROUND OF THE INVENTION

This invention relates generally to aircraft navigation, and more specifically, to methods and systems for sensing aircraft airspeed.

Airspeed measurement is utilized as a navigation aid, a landing aid, and for fuel usage optimization in aircraft of all types. Typically, pressure sensors are utilized to provide the measurements from which airspeed can be calculated. For example, airspeed is calculated from the differential measurement of an impact pressure measured at a pitot port of the aircraft having a pressure sensor mounted within, and a static pressure measured at a static port of the aircraft also having a pressure sensor mounted within.

The above described pressure sensors are typically diaphragm type pressure sensors where pressure changes cause changes in the mechanical displacement of the diaphragms. These displacement changes are then sensed electronically, for example, through measurement of a resistive or capacitive change. The resistive or capacitive change is then converted to a value indicative of a pressure for both the pitot port and the static port. The pressure differential between the ports is then converted to airspeed data that is either displayed through a mechanical readout or by a processor which causes the airspeed to be displayed. Typically in such applications, a temperature sensor is also incorporated to compensate for temperature induced errors as changes in temperature affect operation of the above described pressure sensors.

Diaphragm type pressure sensors are large, costly, and inaccurate at low airspeeds. As such, diaphragm type pressure sensors are not practical in certain applications where measurements of airspeed are desired, for example, for small remotely piloted vehicles.

BRIEF SUMMARY OF THE INVENTION

In one aspect, a system for determining airspeed of an air vehicle is provided. The system comprises an airflow sensor located within an airflow path extending substantially through the air vehicle, and a processor configured to receive a signal relating to an airflow rate from the airflow sensor and output an airspeed based on the received signal.

In another aspect, a method for configuring an air vehicle to determine an airspeed is provided. The method comprises providing an airflow path through the vehicle, locating an airflow sensor within the airflow path, the airflow sensor configured to output a voltage proportional to an airflow, and configuring a unit to determine an airspeed based on the voltage output from the airflow sensor.

In still another aspect, an air vehicle is provided. The air vehicle comprises an airflow path extending substantially through the air vehicle, and an airflow sensor located within the airflow path. The airflow sensor is configured to output a signal representative of an airflow rate through the airflow path. The air vehicle further comprises a unit configured to receive the signal from the airflow sensor. The unit is configured to determine an airspeed of the air vehicle based on the signal received from the airflow sensor.

DETAILED DESCRIPTION OF THE INVENTION

Figure 1:
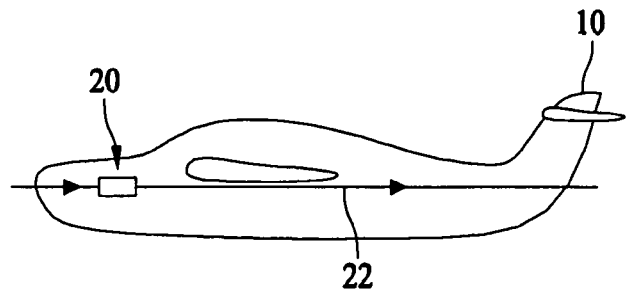
FIG. 1 illustrates an airflow based airspeed sensor within an aircraft.

FIG. 1 is an illustration of an aircraft 10 that incorporates a small, low cost airspeed sensor 20. As further described herein, airspeed sensor 20 is airflow based. Airspeed sensor 20 is believed to be especially suitable for applications in small, low speed, remotely piloted vehicles (RPVs) such as those utilized in reconnaissance applications, for example. To provide airflow across airspeed sensor 20, aircraft 10 is configured with an airflow path 22. In the embodiment illustrated, airflow path 22 extends substantially through the length of aircraft 10, such that airflow path 22 is a path substantially straight from the front of aircraft 10 to its rear. By providing the airflow path 22 through aircraft 10, there is a good airflow over airspeed sensor 20 which results in accurate measurements of airspeed at low airspeeds.

Figure 2:
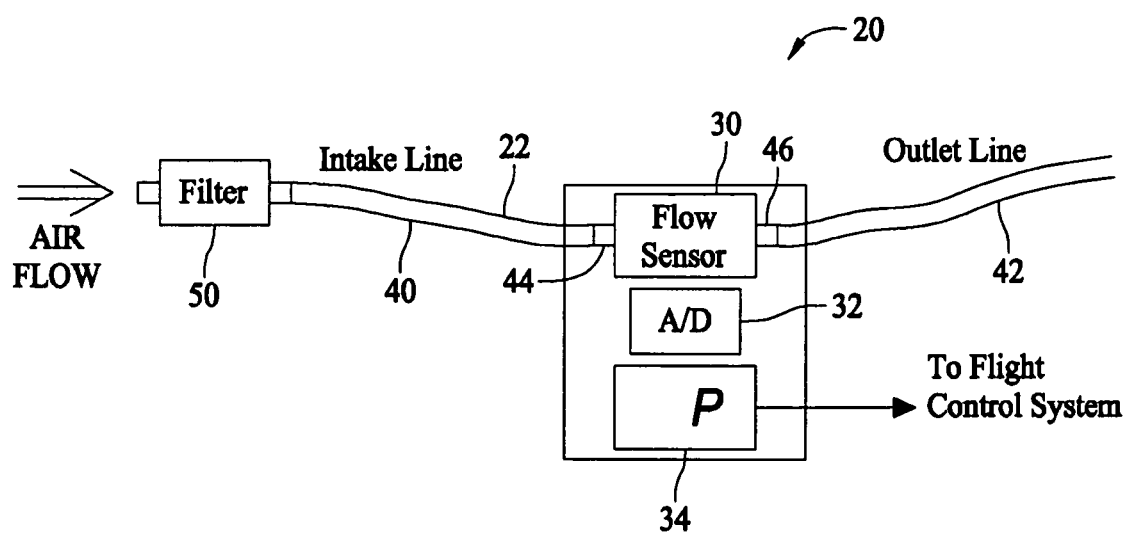
FIG. 2 is a block diagram of the airflow based airspeed sensor.

FIG. 2 is a block diagram of airspeed sensor 20 and airflow path 22. More specifically and in one embodiment, airspeed sensor 20 includes an airflow sensor 30, and analog-to-digital converter 32, and a processor 34 which provides an interface to external systems, for example, a flight control system.

Airflow path 22 includes an intake line 40, the path through airflow sensor 30, and an outlet line 42. An input 44 of airflow sensor 30 is connected to intake line 40, which in one embodiment, is an incoming air stream tube. An output 46 of airflow sensor 30 is connected to outlet line 42, which in one embodiment, is an outlet tube. In the embodiment illustrated, inlet line includes an inline filter 50. In one embodiment, inline filter 50 is located at a front surface of the vehicle, and is configured to substantially eliminate contaminates from entering intake line 40.

As air flows through airflow sensor 30, in one embodiment, a voltage signal is generated. The voltage is generated, in one embodiment and as further described below, by the airflow over temperature sensitive circuit elements that provide signals to one or more amplifiers. The voltage generated within airflow sensor 30 is representative of an airflow rate and is proportional to an airspeed of vehicle 10. The voltage representative of airflow rate is received by an analog-to-digital converter 32 which converts the analog voltage into a digital representation of the analog voltage. The digital representation of the analog voltage is then output to a processor 34. In one embodiment, processor 34 is programmed to calculate an airspeed from the digital representation of the analog voltage. Processor 34 is configured to output data representative of the calculated vehicle airspeed to other systems within vehicle 10, for example, the flight control system.

Figure 3:
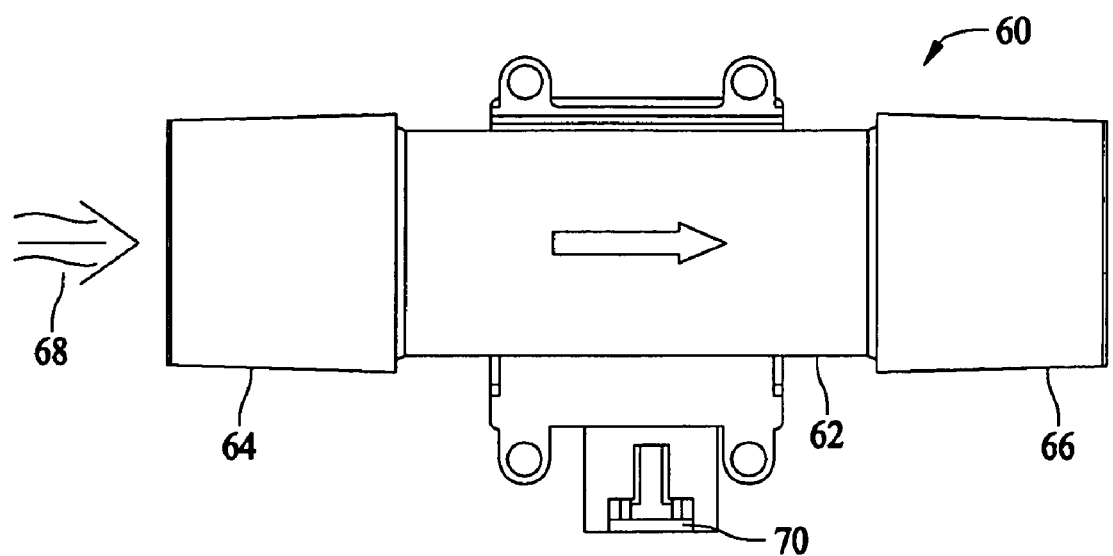
FIG. 3 is a top view of an airflow sensor which is utilized in the airspeed sensor of FIG. 2.

FIG. 3 is a top view of an airflow sensor 60, which is one embodiment of airflow sensor which can be utilized in airspeed sensor 20 of FIG. 2. Airflow sensor 60, in one embodiment, operates utilizing a thermally isolated bridge structure (not shown in FIG. 3) which includes a heater and temperature sensing elements. Airflow sensor 60 includes a bypass type flow housing 62 having an inlet port 64 and an outlet port 66 formed as a part of housing 62. The bridge structure is in direct contact with a flow stream 68 passing through airflow sensor 60, which reduces error possibilities due to clogging.

Figure 4:
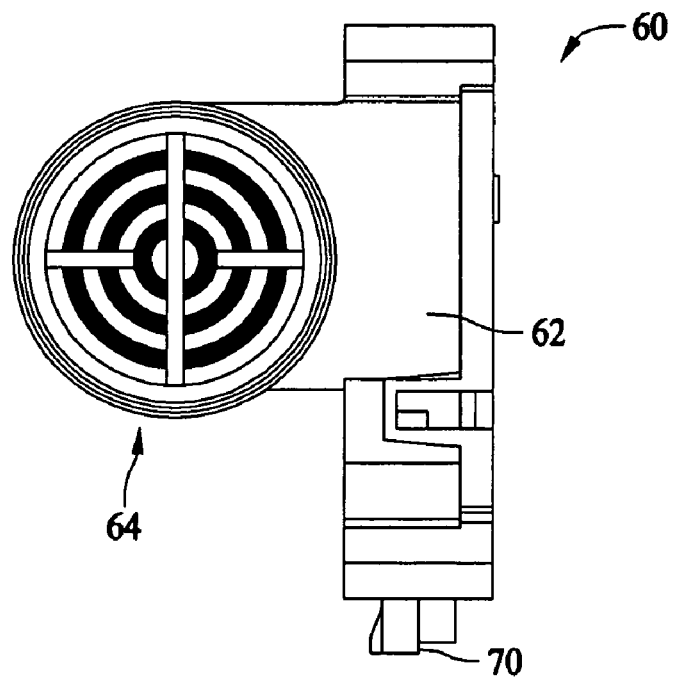
FIG. 4 is an end view of the airflow sensor of FIG. 3.

FIG. 4 is an end view of airflow sensor 60. The bridge structure within mass airflow sensor 60 utilizes heat transfer for operation. More specifically, air stream 68 (shown in FIG. 3) is directed across a surface of the temperature sensing elements. An output voltage present at an electrical connector 70 of airflow sensor 60 varies in proportion to the flow of air stream 68 through inlet port 64 and outlet port 66 of housing 62. In one embodiment, housing 62 precisely directs and controls air stream 68 across the bridge structure which incorporates temperature sensitive resistors that are suspended in the form of two bridges over an etched cavity in silicon. The bridge structure is located in a precisely dimensioned airflow channel within housing 62 to provide a repeatable flow response. Highly effective thermal isolation for the heating element and the sensing resistors is attained due to the etched cavity. Within airflow sensor 60, the bridge structure is small in size, for example, housing 62 in one embodiment is about 1.3 inches wide. The above described thermal isolation of the bridge structure provide airflow sensor 60 with a fast response time and high sensitivity to air streams.

Figure 5:
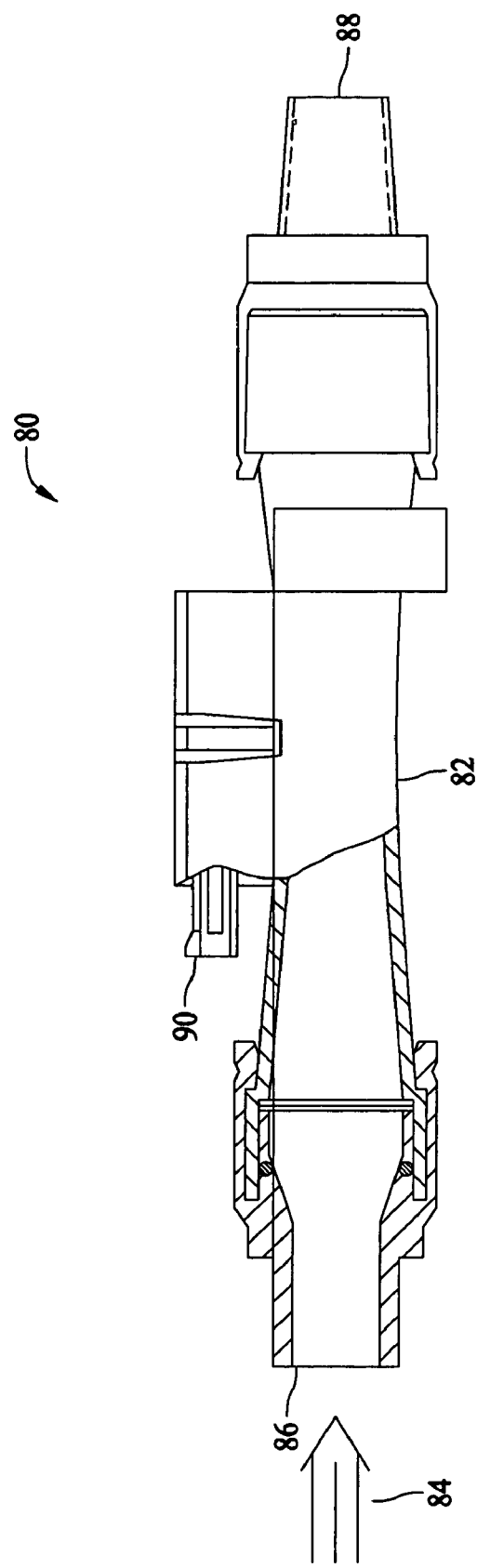
FIG. 5 is a side view of an alternative airflow sensor which can be utilized in the airspeed sensor of FIG. 2.

FIG. 5 is a side view of an alternative airflow sensor 80 which can be utilized within airspeed sensor 20 of FIG. 2. Airflow sensor 80 includes a venturi type flow housing 82 which provides for a low pressure drop associated with an air stream 84 passing through housing 82. Airflow sensor 80 also incorporates a suspended bridge structure that is in direct contact with air stream 84 passing through airflow sensor 80, which reduces errors due to clogging of inlet port 86 or a bypass channel (not shown) that is formed within housing 82. Similar to airflow sensor 60 above, airflow sensor 80 includes an outlet port 86. An output voltage present at an electrical connector 90 of airflow sensor 80 varies in proportion to the flow of air stream 84 through inlet port 86 and outlet port 88 of housing 82.

Figure 6:
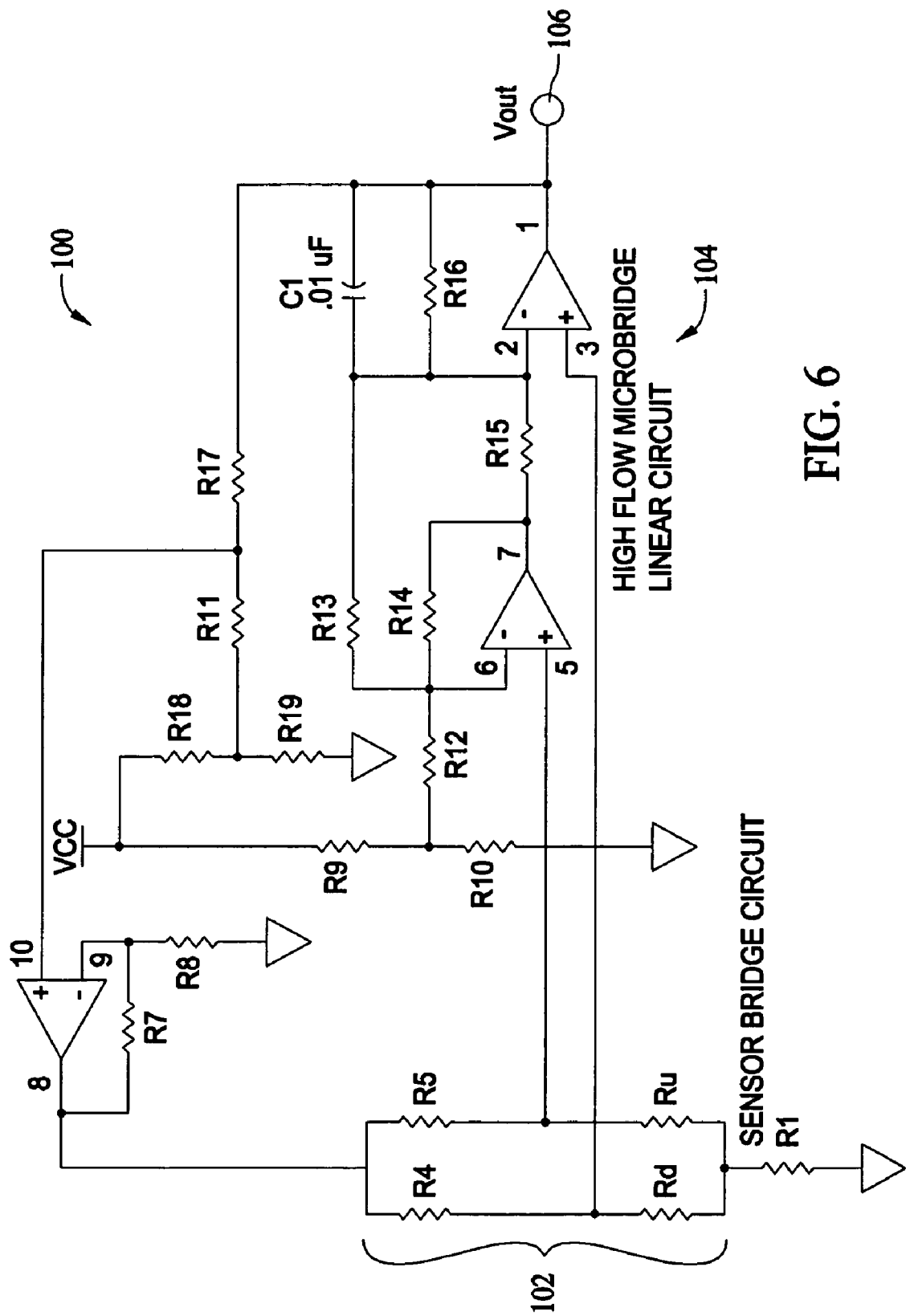
FIG. 6 is a schematic diagram including a bridge structure configured to output a signal based on a sensed an airflow.

FIG. 6 is a schematic diagram of one embodiment of a circuit 100 which incorporates the above described bridge structure, and which can be incorporated into airflow sensors 60 and 80. Specifically, the temperature sensitive bridge circuit 102 provides signals to a linear output circuit 104 which includes a voltage output 106. The voltage present at voltage output 106 is proportional to the airflow over bridge circuit 102.

Airspeed sensor 20 incorporating an airflow sensor 30, for example, one of airflow sensors 60 and 80 or a similar airflow sensor, fulfills a need for a low cost system, as compared to pitot port and static port based airspeed systems for the determination of airspeed. As described above, one application for such an airflow sensor based airspeed system includes applications within small, low speed remotely piloted vehicles. The small size of airflow sensors 60 and 80, for example, less than two inches wide and six inches long or less is also advantageous for such applications. In the above described embodiments, airflow sensors 60 and 80 are air sensors that are sometimes referred to as mass airflow sensors. Such mass airflow sensors are typically utilized in metering and control of heating and ventilation systems, air pollution instrumentation, medical equipment, process control, and leak detection equipment. Utilizing such an airflow sensor, along with the above described digital circuitry (i.e., analog-to-digital converter 32 and processor 34) provides the basis for a low cost, low speed airspeed sensing system. In one embodiment, airflow sensor 30 includes a heat generating element 60 located within intake line 40, upstream from temperature sensing elements, such that sensed temperature is directly proportional to rate of airflow, and ultimately airspeed, across the heater/temperature sensing elements. In the embodiment, airflow sensor 30 is fabricated is contained on a silicone chip and packaged for direct mounting on printed circuit boards, resulting in a very small airspeed sensor assembly.

While the invention has been described in terms of various specific embodiments, those skilled in the art will recognize that the invention can be practiced with modification within the spirit and scope of the claims.

What is claimed is:

1. A system for determining airspeed of an air vehicle comprising:
   an airflow sensor located within an airflow path extending substantially through the air vehicle; and
   a processor configured to receive a signal relating to an airflow rate from said airflow sensor and output an airspeed based on the received data.

2. A system according to claim 1 wherein said airflow sensor comprises a mass airflow sensor.

3. A system according to claim 1 wherein said airflow sensor is configured to output a voltage related to an airflow rate, said system comprising an analog-to-digital converter coupled between said airflow sensor and said processor.

4. A system according to claim 3 wherein said processor is configured to receive digital data from said analog-to-digital converter related to airflow rate, said processor configured to calculate an airspeed from the digital data.

5. A system according to claim 4 wherein said processor is configured to output the calculated airspeed to at least one external system.

6. A system according to claim 1 wherein said airflow sensor comprises an inlet port and an outlet port, said airflow path comprising:
   an air intake extending substantially straight from a front surface of the vehicle to said inlet port of said airflow sensor; and
   an outlet line extending substantially straight from said outlet port to a rear surface of the air vehicle.

7. A system according to claim 6 wherein said air intake comprises a filter located therein.

8. A system according to claim 1 wherein said air flow sensor comprises a heat generating element located therein.

9. A system according to claim 1 wherein said airflow sensor comprises at least one temperature sensing element, configured such that a sensed temperature is directly proportional to rate of airflow across said at least one temperature sensing element.

10. A system according, to claim 1 wherein said airflow sensor comprises a housing, said housing configured as one of a venturi housing and a bypass flow housing.

11. A method for configuring an air vehicle to determine an airspeed, said method comprising:
   providing an airflow path through the vehicle;
   locating an airflow sensor within the airflow path, the airflow sensor configured to output a voltage proportional to an airflow; and
   configuring a unit to determine an airspeed based on the voltage output from the airflow sensor.

12. A method according to claim 11 wherein configuring a unit comprises:
   converting the voltage output by the airflow sensor to a digital representation of the voltage utilizing an analog-to-digital converter; and programming a processor to calculate an airspeed from the digital representation of the voltage.

13. A method according to claim 11 wherein providing an airflow path through the vehicle comprises:
    forming an air intake path extending substantially straight from a front surface of the vehicle to an inlet port of the airflow sensor; and
    configuring the vehicle with an outlet line extending substantially straight from an outlet port of the air flow sensor to a rear surface of the air vehicle.

14. A method according to claim 13 further comprising configuring the air intake path with a filter.

15. An air vehicle comprising:
    an airflow path extending substantially through said air vehicle;
    an airflow sensor located within said airflow path, said airflow sensor configured to output a signal representative of an airflow rate through said airflow path; and
    a unit configured to receive the signal from said airflow sensor, said unit configured to determine an airspeed of said air vehicle based on the signal received from said airflow sensor.

16. An air vehicle according to claim 15 wherein the signal from said airflow sensor is a voltage, wherein said unit comprises:
    an analog-to-digital converter; and
    a processor, said processor configured to receive digital data from said analog-to-digital converter related to airflow rate through said airflow sensor, said processor configured to calculate an airspeed of said air vehicle from the digital data.

17. An air vehicle according to claim 16 wherein said processor is configured to output the calculated airspeed to at least one external system.

18. An air vehicle according to claim 15 wherein said airflow sensor comprises a mass airflow sensor.

19. An air vehicle according to claim 15 wherein said airflow sensor comprises an inlet port and an outlet port, said airflow path comprising:
    an air intake extending substantially straight from a front surface of said air vehicle to said inlet port of said airflow sensor; and
    an outlet line extending substantially straight from said outlet port to a rear surface of said air vehicle.

20. An air vehicle according to claim 19 wherein said air intake comprises a filter located therein.

21. An air vehicle according to claim 15 wherein said air flow sensor comprises a heat generating element located therein.

22. An air vehicle according to claim 15 wherein said airflow sensor comprises at least one temperature sensing element, said temperature sensing element configured such that a sensed temperature is directly proportional to rate of airflow across said at least one temperature sensing element.

23. An air vehicle according to claim 15 wherein said airflow sensor comprises a housing, said housing configured as one of a venturi housing and a bypass flow housing.

* * * * *